United States Patent
Kantonen et al.

(10) Patent No.: US 6,682,005 B2
(45) Date of Patent: Jan. 27, 2004

(54) METHOD OF RECOVERY OF PRECIOUS METALS & HEAVY MINERALS

(75) Inventors: Calvin Leslie Kantonen, Vancouver (CA); John Brian Nichole, Vancouver (CA); Robert Salter, Peterborough (CA)

(73) Assignee: First American Scientific Corp., Vancouver (CA)

( * ) Notice: Subject to any disclaimer, the term of this patent is extended or adjusted under 35 U.S.C. 154(b) by 0 days.

(21) Appl. No.: 10/125,538

(22) Filed: Apr. 19, 2002

(65) Prior Publication Data

US 2002/0179751 A1 Dec. 5, 2002

(30) Foreign Application Priority Data

Apr. 19, 2001 (CA) .............................................. 2344511

(51) Int. Cl.[7] .............................................. B02C 19/06
(52) U.S. Cl. .............................................. 241/5; 241/19
(58) Field of Search .............................. 241/5, 19, 29, 241/80, 275

(56) References Cited

U.S. PATENT DOCUMENTS

| | | |
|---|---|---|
| 2,012,694 A | 8/1935 | Runyan |
| 2,707,314 A | 5/1955 | Horth |
| 3,032,280 A | 5/1962 | Whitney et al. |
| 3,155,326 A | 11/1964 | Rhodes |
| 3,834,631 A | 9/1974 | King |
| 3,848,815 A | 11/1974 | Carpenter, Jr. et al. |
| 4,575,013 A | 3/1986 | Bartley |
| 4,662,571 A | 5/1987 | MacDonald et al. |
| 5,060,870 A | 10/1991 | Trezek et al. |
| 5,215,262 A | 6/1993 | Binder |
| 5,280,857 A | 1/1994 | Reichner |
| 5,381,968 A | 1/1995 | Lohnherr et al. |
| 5,673,860 A | 10/1997 | Heinemann et al. |
| 5,695,130 A | 12/1997 | Csendes |
| 5,967,432 A | 10/1999 | Chen |
| 6,042,032 A | 3/2000 | Pinoncely |
| 6,375,103 B1 * | 4/2002 | Huang et al. .............. 241/79.1 |

* cited by examiner

*Primary Examiner*—Allen Ostrager
*Assistant Examiner*—Jimmy T Nguyen
(74) *Attorney, Agent, or Firm*—Birch, Stewart, Kolasch & Birch, LLP

(57) ABSTRACT

Raw material containing precious metals and heavy minerals is introduced into a comminuting chamber. The raw material falls onto rotating chains which drive the material against the side wall of the chamber with sufficient velocity to cause the raw material to fracture. Air flows upwardly at the side wall and classifies the particles into a first fraction which falls to the floor of the chamber and a second fraction which is carried upward to a trommel. Large particles from the trommel are recycled to the chamber while fines are discarded as tailings. The rate of upward flow of air in the chamber, the rate of rotation of the chains and the size of particles separated by the trommel are all adjusted in order to ensure that the particles that collect on the floor of the chamber are rich in precious metals and heavy minerals.

22 Claims, 12 Drawing Sheets

METHOD OF RECOVERY OF PRECIOUS METALS & HEAVY MINERALS

This invention relates to a process for treatment of ores and scrap materials for the extraction of precious metals and heavy minerals and more particularly to a process which involves the simultaneous comminution of raw material and extraction of particles containing a high proportion of precious and heavy minerals from the raw material to facilitate the recovery of such metals and minerals.

Comminution is an essential step in the extraction of metals from their ores and from scrap materials containing such metals. Gold, for example, occurs in quartz veins or lodes and in alluvial placer deposits. Gold is extracted from its ores by comminuting the ores into particles which can be treated by chemical processes such as amalgamation, chlorination and dissolution in cyanide for the extraction of gold.

Comminution of ores or scrap materials can be carried out by conventional methods such as crushing, grinding and milling. A more recent method of comminution involves propelling particles of the material against a wall with sufficient force to cause the material to shatter into small particles. U.S. Pat. Nos. 5,839,671 and 6,024,307 issued on Nov. 24, 1998 and Feb. 15, 2000, respectively, both to Sand et al. describe the latter method.

Following comminution, the resulting particles must be further concentrated to remove the valuable metals and heavy minerals from them. Concentration is usually carried out in two or more stages and is accomplished by leaching, by flotation, by magnetic separation and so on.

We have found that comminution and a first stage of concentration of ores and scrap material containing precious metals and heavy minerals be carried out virtually simultaneously. If such material is propelled against a wall with sufficient force the material shatters into particles that can be classified in a stream of air which rises rapidly adjacent to the wall. Surprisingly, particles having a high proportion of precious metals and heavy minerals tend to hug the wall and fall while all other particles tend to be carried upwardly in the stream of air. This is unexpected; what would be expected is that the weight of the particles would govern whether they rise or fall. However what, in fact, governs this is the degree of purity of precious metals or heavy minerals in the particles. Light, smaller particles rich in precious metals or heavy minerals fall while heavy relatively large particles are carried upwardly in the stream of air.

Particles which fall in the stream of air contain little gangue and can be further concentrated at significantly less cost that particles of the same size from a conventional crushing or grinding operation. That is because particles from a conventional crusher or grinder generally contain significantly more gangue and such gangue adds to the overall cost of concentration.

Briefly, the process of our invention involves the steps of:
(i) providing a comminuting chamber having an interior space defined, in part, by side and lower walls;
(ii) directing raw material containing precious metals and heavy minerals downwardly onto impelling means located within the chamber such that the raw material collides with the impelling means and is driven thereby against the side wall with sufficient velocity to cause the raw material to fracture into a first fraction of particles which contain a substantial proportion of precious metals and heavy minerals and which are of a size in the range at which any precious metals and heavy minerals therein are substantially liberated from the remainder of the raw material, a second fraction of particles which are of a size in the same range but which contain substantially less precious metals and heavy minerals and a third fraction of particles which are of a size larger than the range;
(iii) causing air to flow into the chamber and along a path including: upwardly along the side wall;
(iv) recovering particles which collect on the lower wall for separation of precious metals and heavy minerals therefrom.

For the recovery of gold, my process briefly involves the steps of directing raw material containing gold downwardly onto impelling means located within the chamber such that the raw material collides with the impelling means and is driven thereby against the side wall with sufficient velocity to cause the raw material to fracture into a first fraction of particles which contain a substantial proportion of gold and which is of a size in the range at which any gold therein is substantially liberated from the remainder of the raw material, a second fraction of particles which are of a size in the same range but which contain substantially less gold and a third fraction of particles which are of a size larger than the range; causing air to flow into the chamber and along a path including upwardly along the side wall; and recovering particles which collect on the lower wall for separation of gold therefrom.

The process of our invention is preferably carried out in the apparatus illustrated in the drawings. In the drawings.

Like reference characters refer to like parts throughout the description of the drawings.

Figure 1:
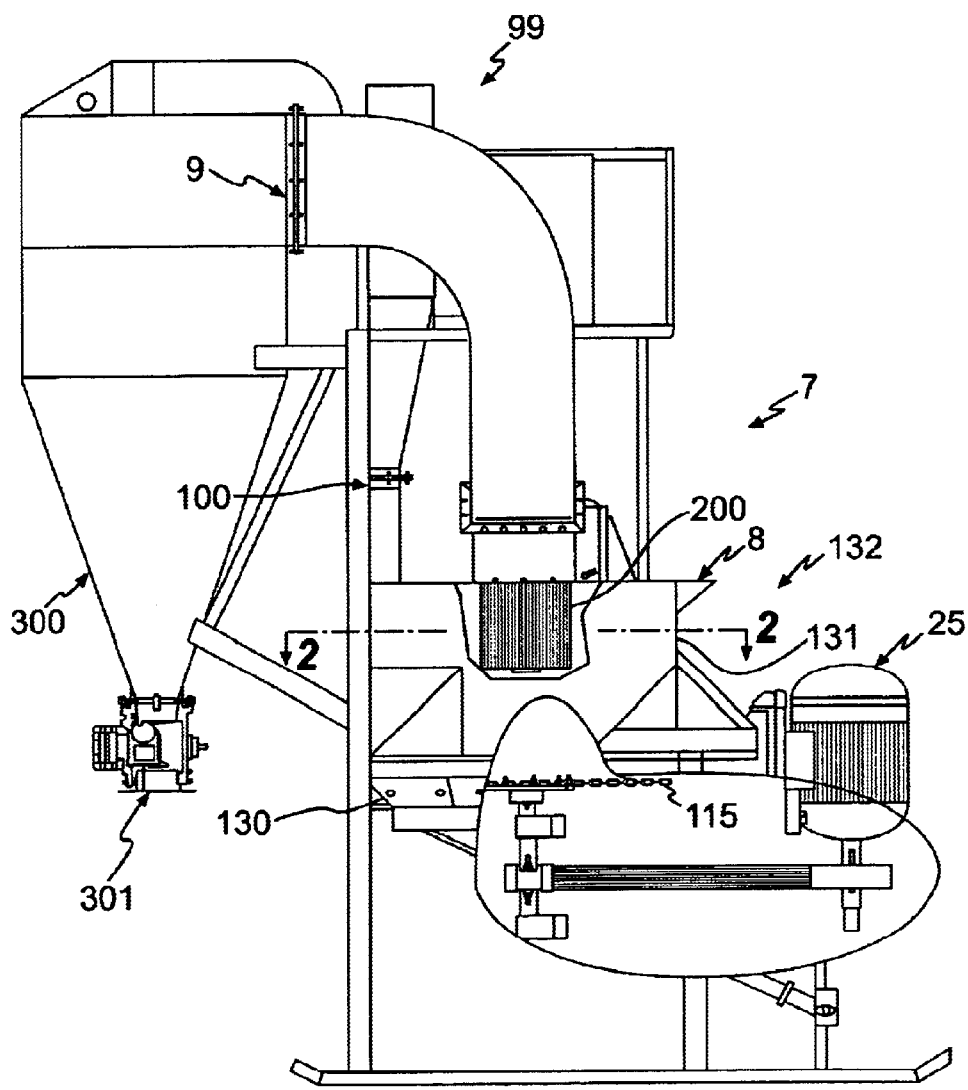
FIG. 1 is a side view, partially broken away, of the apparatus.
Figure 3:
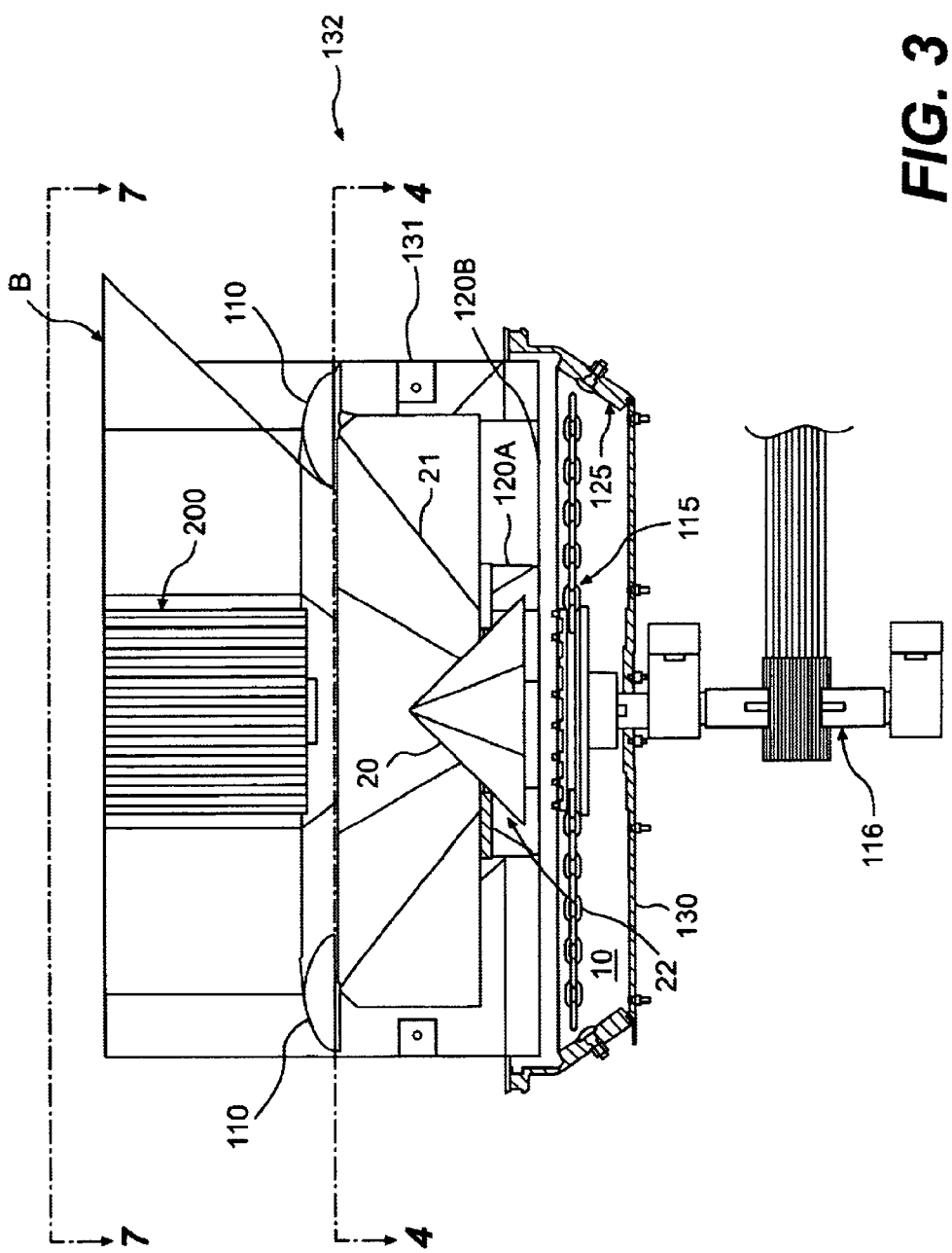
FIG. 3 is a sectional side view taken along lines 3—3 of FIG. 2.

As seen in FIGS. 1 and 3, the apparatus, generally 7 has an input chute 8 for raw material and an output 9 for fine, light rejects or tailings. Main body 132 of the apparatus is the combination of pan 130 and lid assembly 131. Conventional forced air means or blower 99 is connected to main body 132 at inlet 100. The bottom of lid assembly 131 and pan 130 form the chamber in which liberation and separation of the precious metals and heavy minerals from the remainder of the raw material occurs.

Downstream of the chamber 10 are output 9, cyclone 300 and cyclone collection output gate valve 301, and they, with input gate valve (not shown) connected to input 8, maintain intrinsic air pressure of the system. Blower 99 recycles air from cyclone 300. Main body 132 has a central axis about which central shaft 116 turns and about which separator 200 and chamber 10 are centered.

Figure 2:
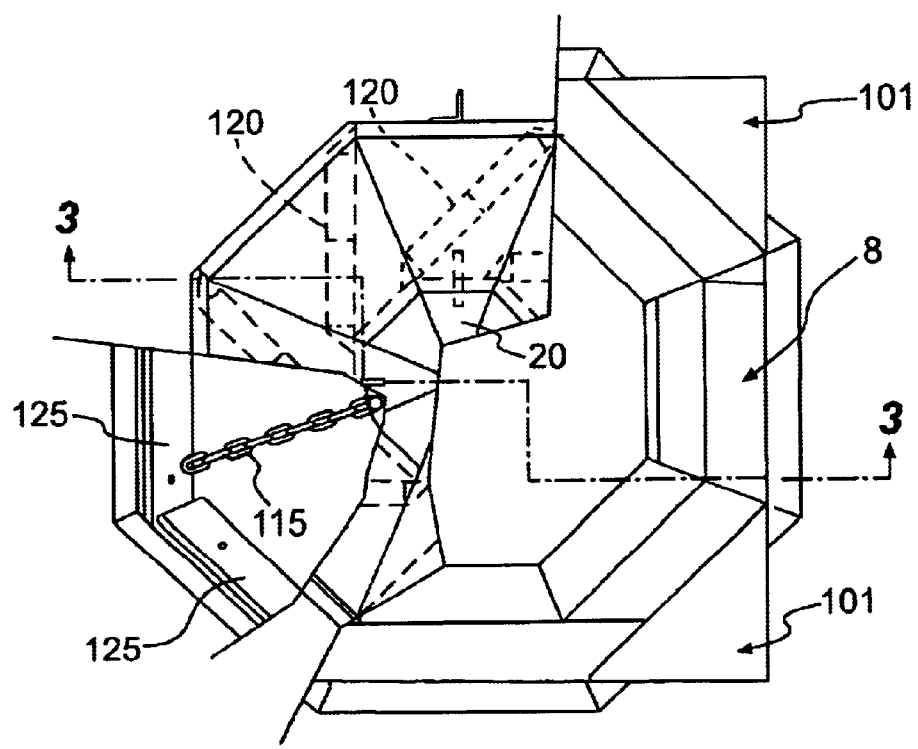
FIG. 2 is a sectional plan view taken along line 2—2 of FIG. 1.
Figure 4:
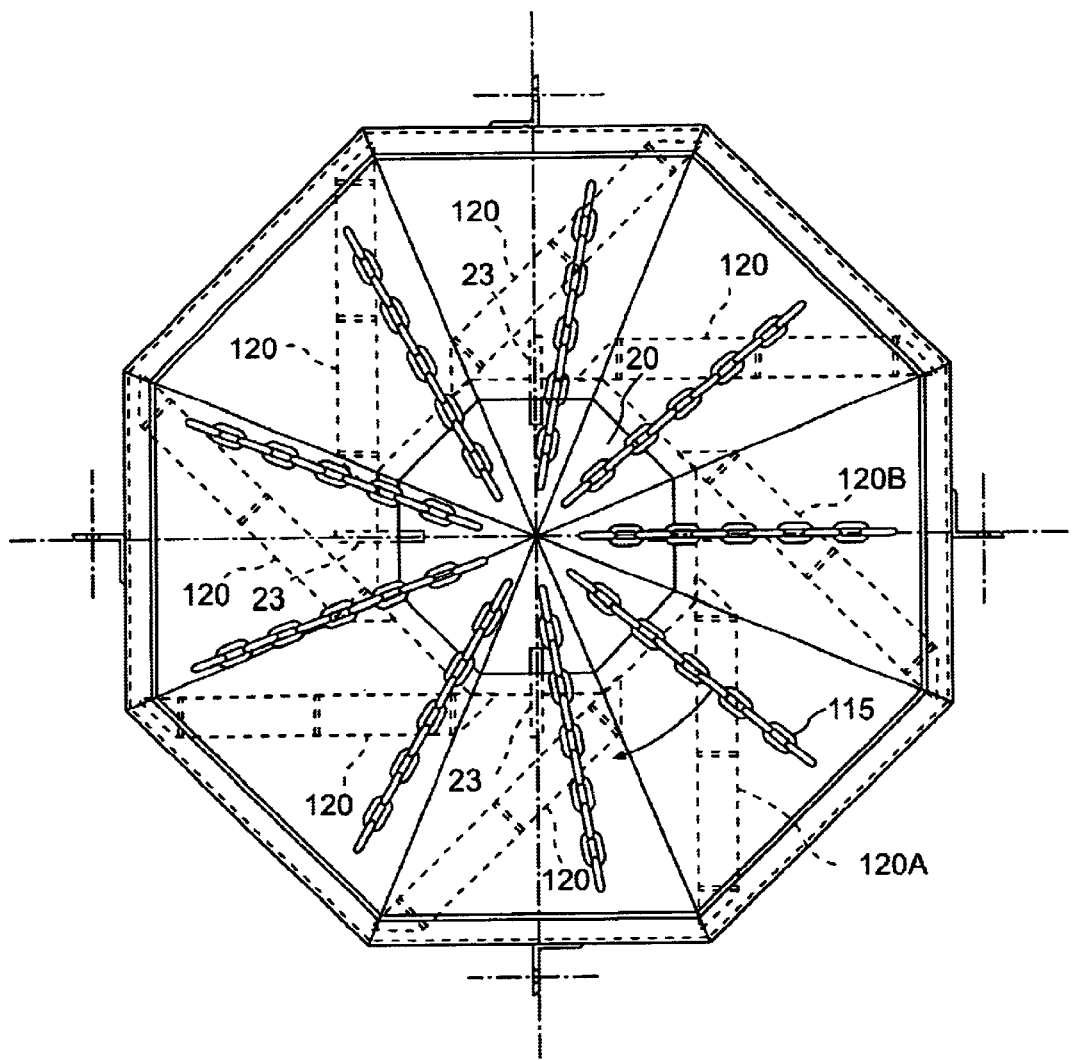
FIG. 4 is a plan view taken along lines 4—4 of FIG. 3.

As shown in FIGS. 2 to 4, a deflecting cone 20 is hollow, inverted and open and is supported by struts 23, about the central axis, with apex pointing upwardly. Cone 20 is, disposed centrally within the hollow of inverted, hollow frusto-conical cone 21, creating an annulus of separation 22 for the raw material from input 8 to fall through.

At the bottom of lid assembly 131 is a metal plate to which eight shear blades 120 are rigidly disposed tangentially and equispaced from a central octagonal hub centered on the central axis. Blade 120 is disposed about 61 degrees from the horizontal downwardly in the circular direction of rotation of chains 115 (as indicated in FIG. 4). Blade 120 (viewed from the side as shown in FIG. 3) has an inner edge 120A (proximate annulus 22) and a bottom edge 120B.

Pan 130 is hinged to one side of lid assembly 131 and is provided with sealing features so that when it is raised to meet the bottom of lid assembly 131 at their respective peripheries and secured by fasteners, an air-tight seal is created for chamber 10. Pan 130 may be opened for cleaning and replacing blades 120, chains 115 and like activities. For economy of illustration, the hinging mechanism, sealing and fasteners are conventional and are not shown.

Figure 5:
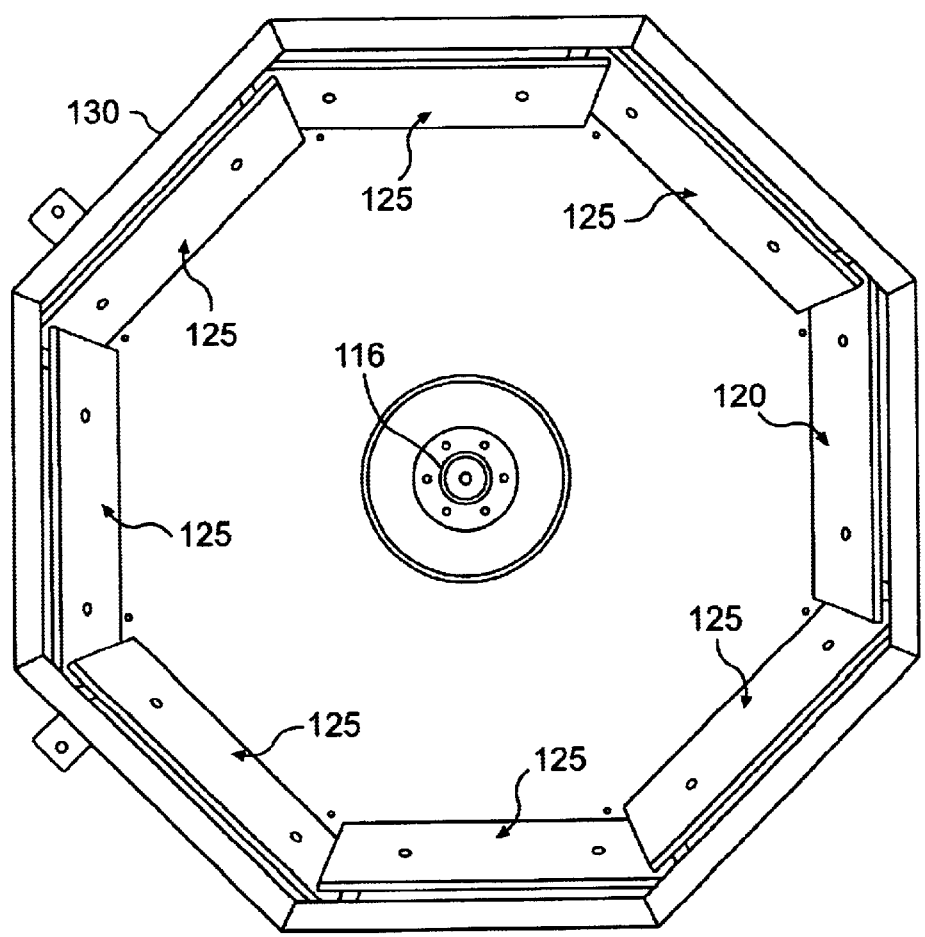
FIG. 5 is a plan view of the pan of the device of FIG. 1.
Figure 13:
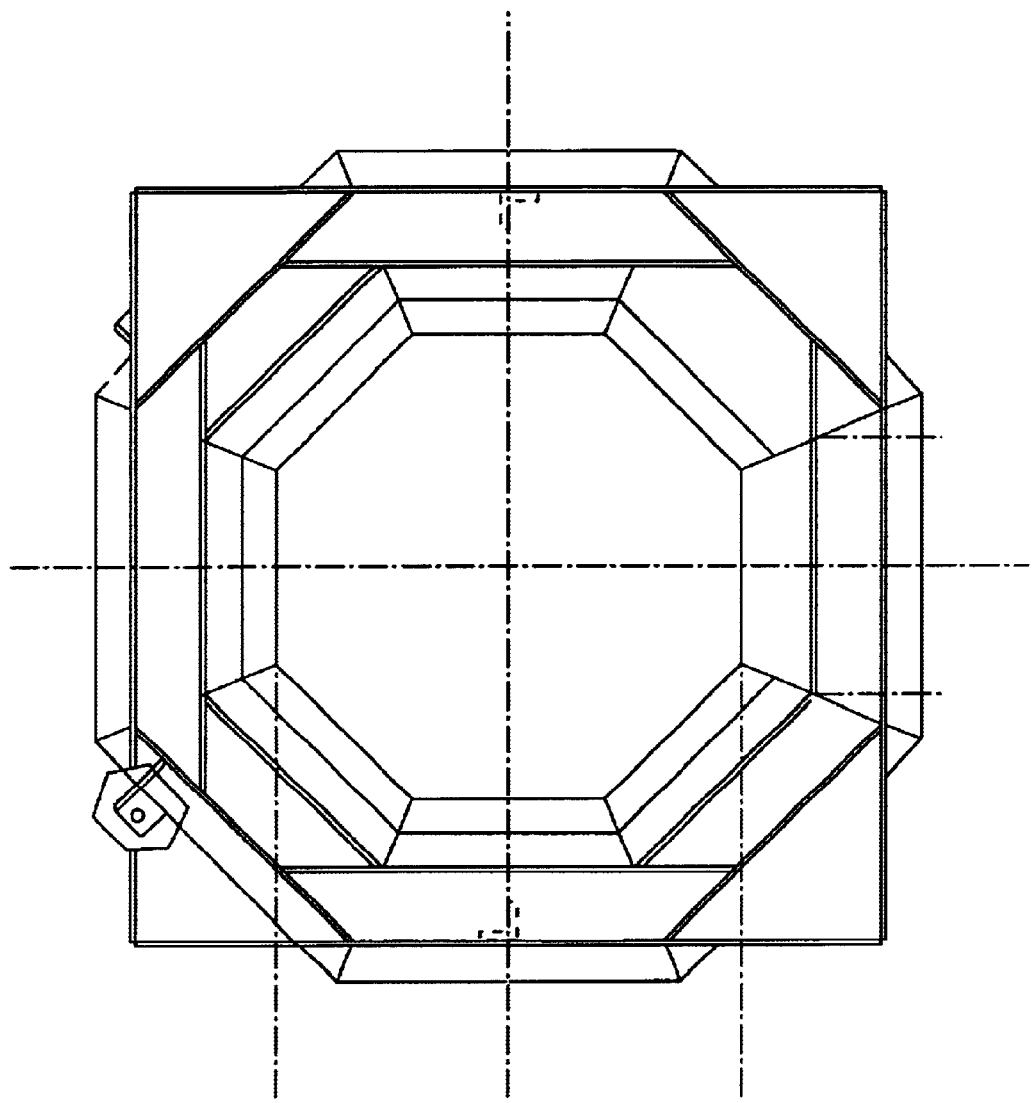
FIG. 13 is a plan view of an embodiment of the pan of the device of FIG. 1.

As best shown in FIG. 5, eight wall plates 125 are disposed circumferentially about the interior periphery of pan 130 to form the interior wall thereof Each plate 125 is disposed at about 45 degrees from the horizontal bottom of the pan 130. The interior of the pan 130 is essentially circular and precisely octagonal and can be made more smooth and circular by conventional means as in the embodiment of the wall plates illustrated in FIG. 13. In that embodiment, the adhesion or hang-up of particles containing precious metals or heavy minerals within the pan is substantially reduced or eliminated.

More and smaller plates may also be employed to make the chamber smoother and more circular however more joints and edges will result in which particles containing precious metals and heavy minerals may adhere or hang-up. Bevelling of the plates on top and sides will also help in reducing hang-up but fine particles of gold and other precious metals and heavy minerals tend to fill and line every seam making FIG. 13 the preferred embodiment.

Figure 11:
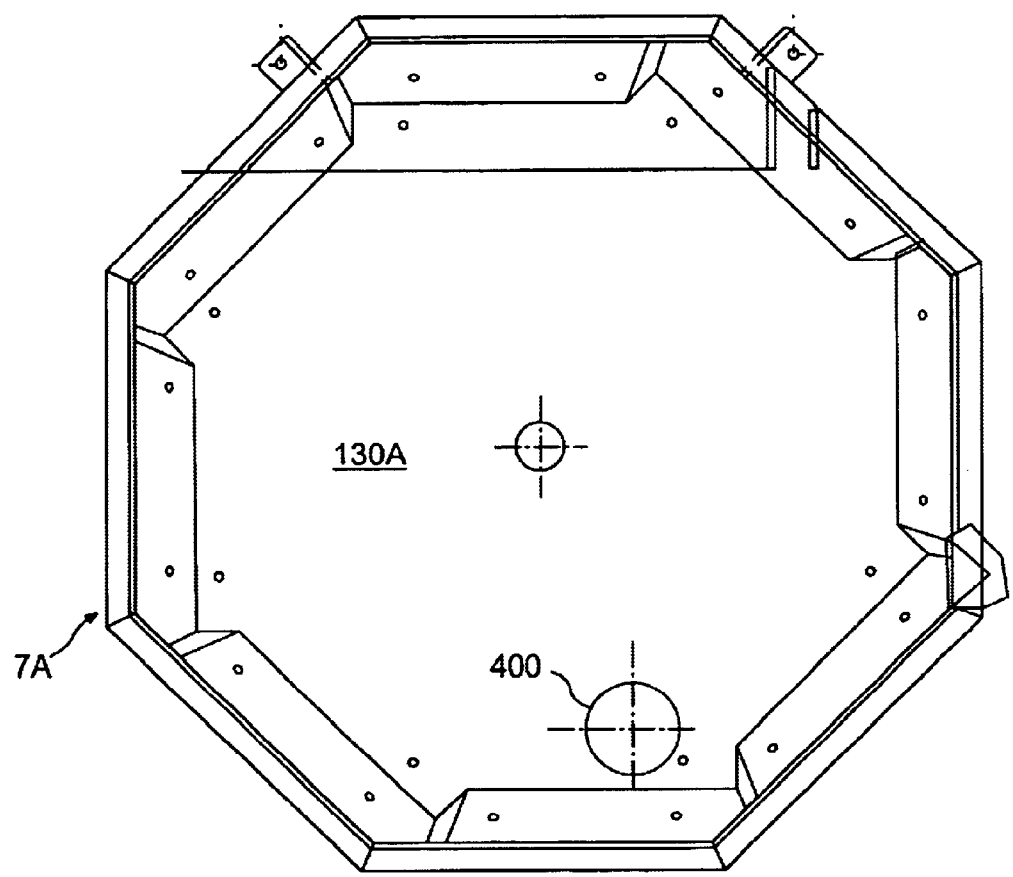
FIG. 11 is a plan view of an embodiment of the pan of the device of FIG. 1.
Figure 12:
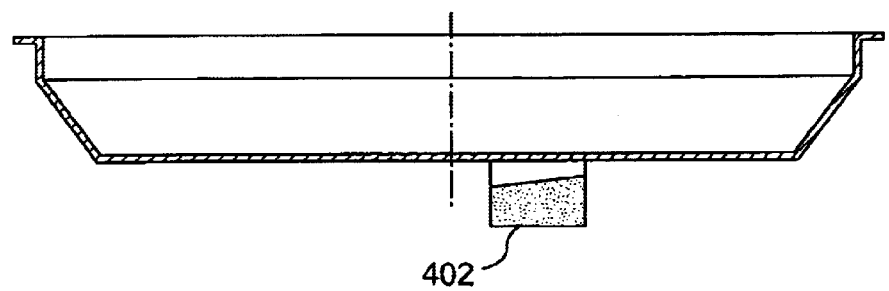
FIG. 12 is a side view of the embodiment of the pan of the device of FIG. 11.

As best shown in FIG. 11, another embodiment of the apparatus exhibits a large hole 400 in the bottom of the pan 130A covered by a flat, coarse screen or plate with large perforations, such hole being near but not at the wall plates 125. The hole maybe of any diameter up to one third the diameter of the pan 130A. The diameter for the preferred embodiment is 3 to 8 inches to maximize grade and recovery of the heavy minerals and coarse, heavy gold and other precious metal rich product. The hole in the bottom of the pan is connected to a pipe 402 shown in FIG. 12 which is capped to collect the heavy product and allow recovery on a batch basis when the apparatus 7A is shut down. Another embodiment allows for recovery of the heavy product on a continuous basis without shut down of the apparatus 7A by attachment of a rotary star valve, double gate or butterfly valves (not illustrated) or other conventional air lock device to the pipe.

Multi-link chains 115 are conventionally secured at their respective inner ends to central shaft 116 but are otherwise loose to be rotated quickly. Chains 115 maybe conventional chains for the softest raw materials, with thirteen links, each link of about 2" long, so that the length of a chain 115 is about 22". Nine chains would be used. For medium hard raw materials, nine chains of a ⅜"0 hard steel chain such as G70 load chain would be used, each chain would have about 9 links. For hard raw materials such as quartz, very hard specialty chains such as 4 chains of 8 links of ⅝" boronite maybe required to improve durability.

Although it has been found that 9 chains 115 is a suitable number for the chamber 10 where the pan 130 is about 4 feet in diameter and 10" in height, the preferred embodiment for chain selection and configuration will depend on the raw material. Generally, it has been found that the greater number of chains, the greater the efficiency of comminution and therefore the liberation of the gold particles and the higher the gold recovery but this is subject to increased risk of entanglement of the chains when rotated.

In a still further embodiment of the apparatus the multi-link chains 115 may be substituted with assemblages of chain links and rods and/or sections of metal strip to retain some flexibility but increase durability at critical wear points and facilitate the substitution of harder or more wear resistant materials.

Motor 25 rotates central shaft 116 through conventional belt and pulley arrangements. The harder or wetter the raw material or faster the equipment 7 is to be fed, the larger the motor 25. Typically the motor 25 will be between 100 and 300 horse power. The chains 115 spin with tip speeds of about 440 to 880 feet per second, preferably about 735 feet per second or 500 mph to form a spinning "curtain" of metal to move outwardly and accelerate the raw materials falling, thereon from annulus 22.

Air is injected into apparatus 7 through inlet 100 by blower 99, which can inject air in the order of 10,000 to 15,000 cubic feet per minute. To minimize the adverse effects of heating on the comminution/liberation process (described below), cooled air may be injected into the flow stream or the raw material may be pre-cooled before being inputted into the input chute 8; both being accomplished by conventional means (not shown).

Raw material is dropped into input 8 and slides down to fall centrally through annulus 22 and to be then deflected outwardly by cone 20. The raw materials are then propelled outwardly as follows. The raw materials hit the circular "curtain" formed by rotating chains 115, and are then propelled outwardly centrifugally with great acceleration towards wall plates 125 of pan 130. The raw materials vertically and violently bounce between the curtain formed by spinning chains 115 and the bottom of lid assembly 131, and also horizontally impact violently against blades 120 as they move outwardly towards wall plates 125 of pan 130. The raw materials then impact violently against the wall plates 125 of pan 130 at high speeds. These violent impacts accomplish comminution of the raw material causing the particles containing gold or other precious or heavy metals to be liberated from the remainder of the raw material by shattering and similar disintegration.

Rotating chains 115 do not normally impinge on any part of comminution chamber (i.e. unless there is a collision with raw material which distorts temporarily the orbit of chains 115). Chains 115 rotate with clearance of about 2" from the bottom of pan 130, of about 1" from blades 120 and, (from the outer free tips of chains 115) of about 1" from plates 125.

Although chains 115 are shown, similar forms of agitator elements are possible (such as blades and disks with perforations and protuberances), as long as they are useful when rotated to impact violently the raw material and to propel outwardly.

The flow of air is shown in FIGS. 7 to 10, which (with the exception of FIG. 8) are simplified by omitting details not directly applicable to the illustration of a certain aspect of the air flow.

Figure 7:
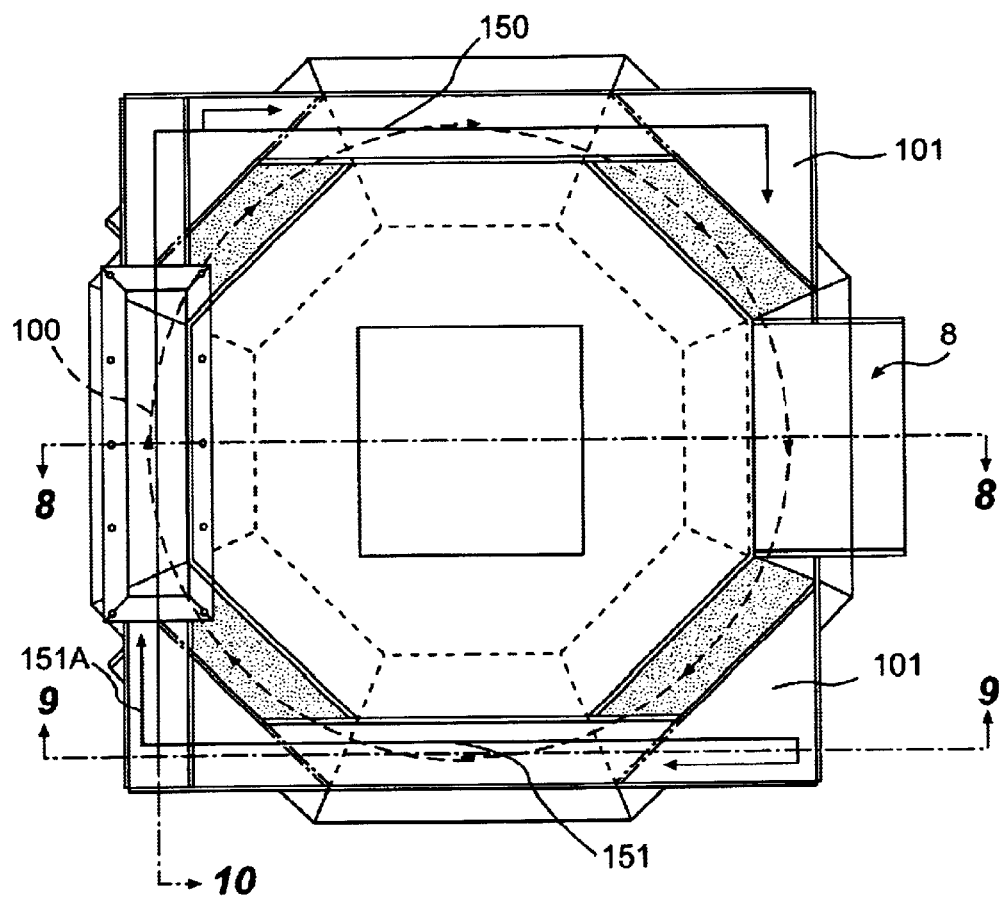
FIG. 7 is a plan view of the flow of injected air seen from line 7—7 of FIG. 3.

Forced air enters comminution/liberation chamber 10 from blower 99 through inlet 100. The air is then channeled into two downward flows (150 and 151) and then four travelling downwardly through four vertical corners equispaced about pan 130. The four jets of air are directed equispaced and downwardly approximately tangential to the circular assembly of wall plates 125 of pan 130, as seen in FIG. 7. Thus a fast moving "torus" or toroidal pattern of air is created within pan 130 (shown in plan cross section in dotted arrow in FIG. 7). The toroidal flow pattern dissipates approximately as follows. The air partially circles pan 130 and then rises to create a fast moving annular column of air along upward flow lines 152 rising along the inside the side wall of lid assembly 131 which carries therewith the fine, lighter fractions of the raw material after impact with pan wall plates 125.

For ease of illustration and understanding, downward flow 151 will be described below but downward flow 150 will not because it is similar to flow 151 except it is on the other side of the equipment.

Figure 9:
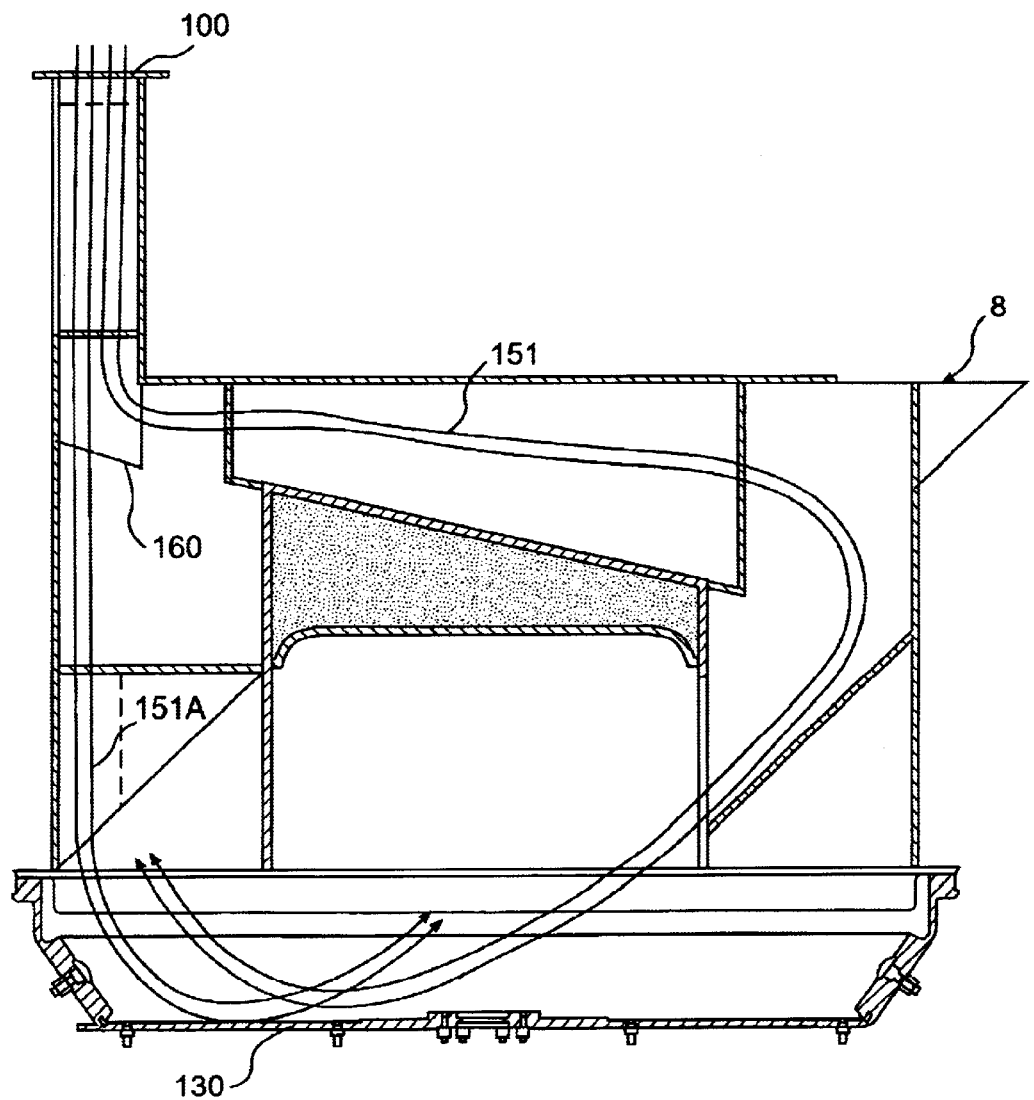
FIG. 9 is a sectional view of the flow of injected air seen from line 9—9 of FIG. 7.
Figure 10:
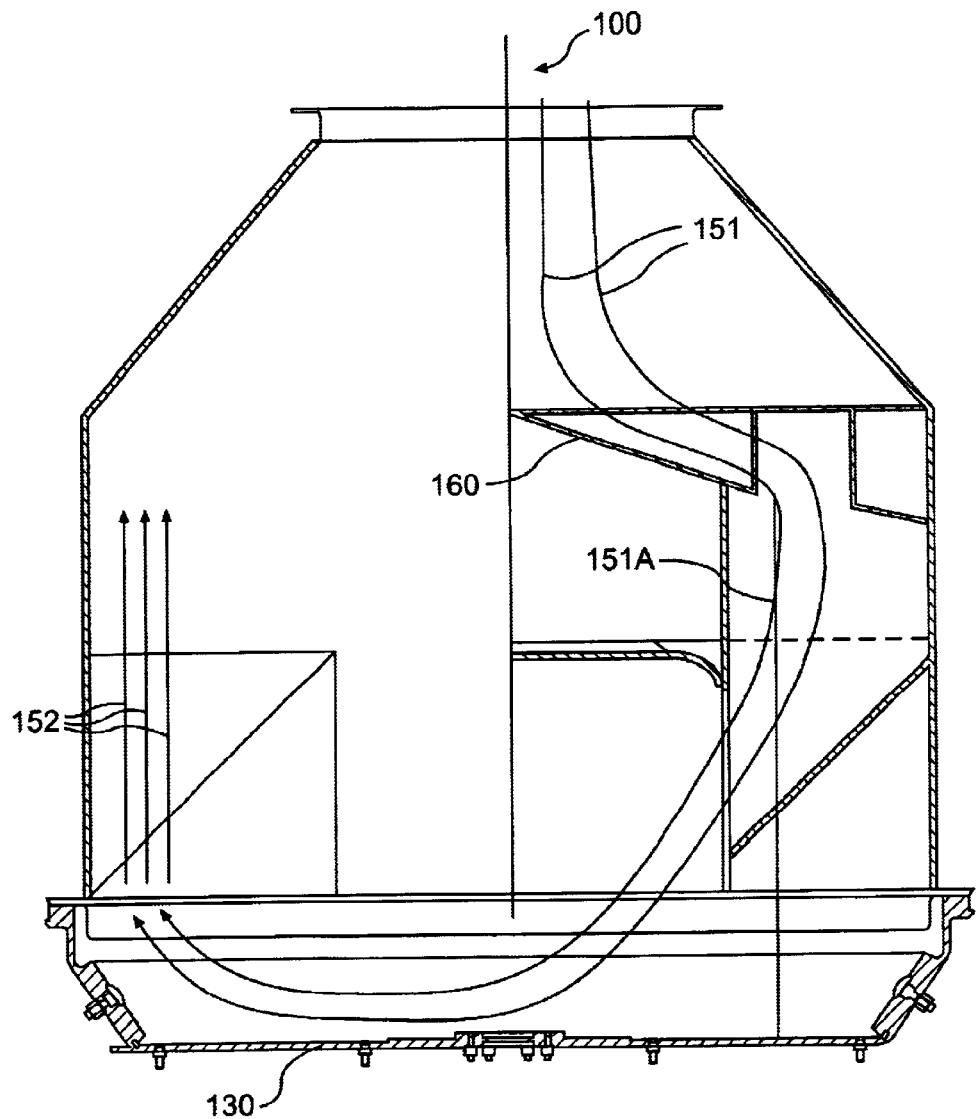
FIG. 10 is a sectional view of the flow of injected air seen from line 10—10 of FIG. 7.

Flow 151 is channelled to flow 151 and 151A (as seen in FIGS. 7,9 and 10). The fine, lighter fraction of the materials, after impacting pan 130 wall, are swept upwardly along the walls of lid assembly 131, along flow lines 152 above annulus 22 and then redirected inwardly and downwardly by redirectional turn 110 towards annulus 22 (i.e. directed back to chamber 10).

Turn 110 is the upper half of a torus tube which extends about the periphery of the lid assembly 131 and operates to filter the material as follows. Some of the heavier material is separated and descends through annulus 22 to enter the chamber 10 again, as represented by flow lines 153, to participate in another cycle of comminution/liberation. The lighter material (in spite of being directed downwardly by turn 110) rises toward separator 200. Some of the material does not pass through separator 200 falls down (as will be explained below) and joins the heavier material, as directed by flow lines 153. Also, the centrifugal effect of turn 110 on the material also serves to move heavier particles containing gold, other precious metals or heavy minerals from the lighter particles of the material to the outside, i.e. produces a separating effect between heavier and lighter particles of the materials. The closer the inner edge of turn 110 is to annulus 22 (i.e. the longer downwardly the material must travel before being able to rise), the finer the filtering effect.

Figure 8:
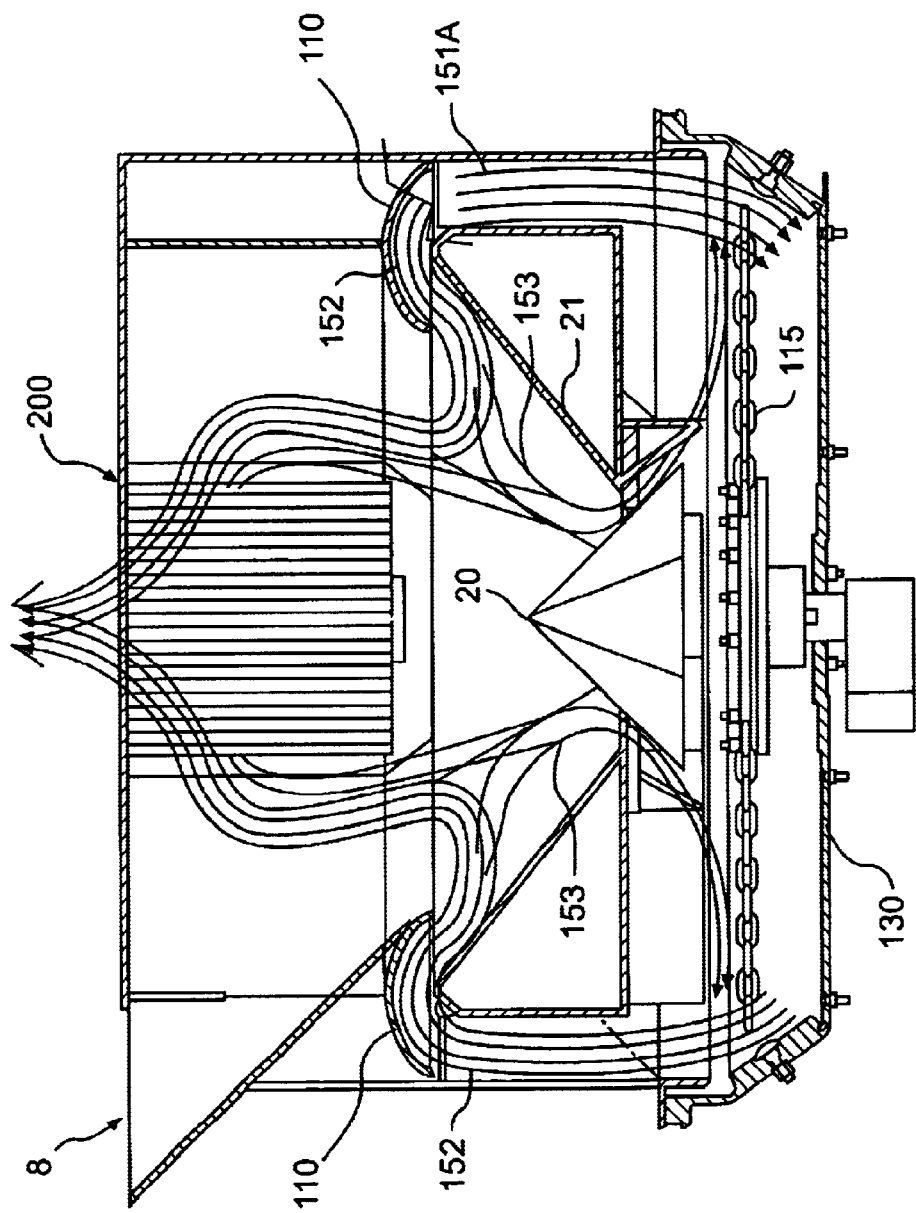
FIG. 8 is a sectional view of the flow of injected air and raw materials seen from line 8—8 of FIG. 7.

As shown in FIG. 8, separator 200 separates the coarser particles from the finer raw material rising along flow lines 152 from the periphery of pan 130 which have not dropped into annulus 22. Raw material of a prescribed particle size or less move into the interior of separator 200 and proceed to output 9 to be discarded as tailings. Material whose particle size is larger than said prescribed particle size, bounce back from separator 200 and into annulus 22, as shown in flow lines 153.

Figure 6:
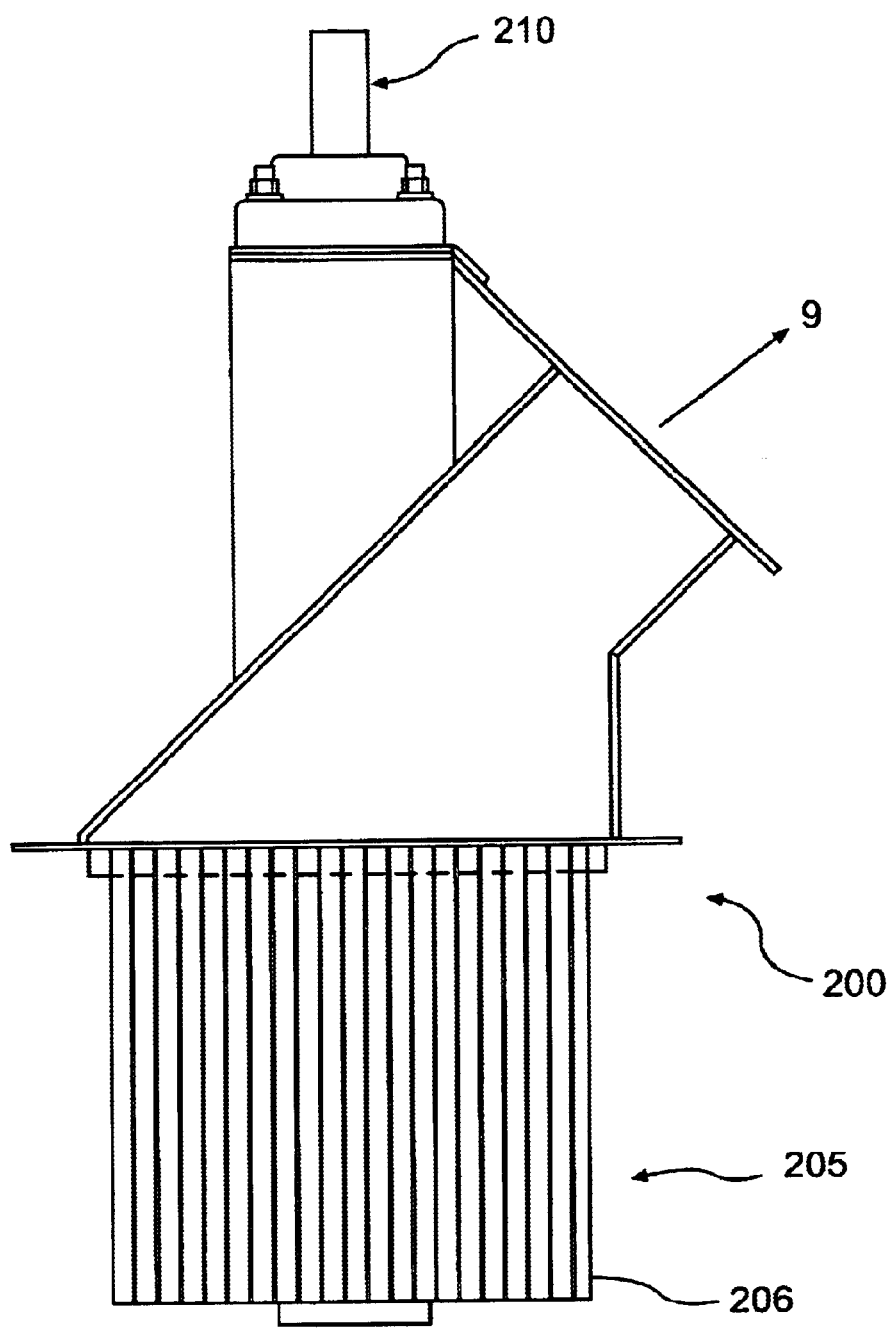
FIG. 6 is a side view of the separator of the device of FIG. 1.

As shown in FIG. 6, separator 200 is of a conventional trommel construction and includes a squirrel cage 205 which is rotated by variable speed motor 210. Cage 205 has circumferentially spaced and equispaced vertical blades. In one embodiment cage 205 had thirty-six blades 206, each a 18" by 1" by ⅛" rectangular plate each disposed about 5 degrees from the radial against the direction of motion. By adjusting the speed of motor 210, the particle size necessary to achieve optimum liberation of the gold particles can be obtained. The faster the rotation, the finer will be the output particles or tailings emerging from separator 200 towards output 9.

The process of the invention is useful for separating precious metals and heavy minerals from such raw materials as rock, quartz rock, sand, gravel, ores, placers, concentrates of ores and other gold, silver and platinum-bearing materials such as electronic and jewellery scrap. Materials containing heavy metallic elements or alloys and minerals, both natural and man made, of heavy metallic elements such as tin, niobium, rare earths, tantalum, uranium, molybdenum, yttrium, lanthanum, zirconium, titanium, tungsten, indium, bismuth, lead and strontium are suitable raw materials.

The process of the invention is described with reference to a gold-containing ore but it is to be understood that the ore can contain other precious metals such as platinum or it can contain the heavy minerals mentioned above.

The ore should consist of particles of not larger than about 1–2 inches. If the ore comes from a quartz vein it must be crushed to particles of the required size in a primary crushing operation.

The first step in the process is to feed the particles of ore into the apparatus described above where it falls until it reaches the chains. The chains drive the particles against the side wall of the apparatus with resulting fracturing of the material.

The rising flow of air serves to classify the fractured particles into a fraction that is rich in gold but substantially free of gangue. Those particles fall and collect on the pan. All other particles are carried upwardly in the stream of air.

Particles carried upwardly travel to the trommel where particles smaller than a given size are expelled as tailings while those larger than such size are recycled to be further reduced in size by the chains.

The steps that are taken to ensure that the particles that collect on the pan are rich in gold while those that are substantially free of gold are expelled are as follows: a sample of the feed material is fed into the apparatus and the particles which are expelled are analyzed. If the expelled particles contain a significant amount of gold, the speed of the trommel is increased in order to reduce the size of particles that are expelled as tailings. If too few are expelled, the rate of rotation of the chains can be increased to increase the volume of fine particles.

The particles on the pan are also analyzed. If they contain a significant amount of gangue, the speed of the air which travels upwardly adjacent to the wall must be increased to lift particles which contain such gangue. Particles which contain a substantial amount of gold will inevitably fall onto the pan.

Once the foregoing steps are carried out, it may be that a significant amount of the feed material is recirculating through the apparatus and too little is collecting on the pan or is being expelled as tailings. The reason for this could be:

(a) The fractured particles of feed material following impact with the side wall of the apparatus are too large. Preferably, the particles should be approximately the size of the fragments of gold in the feed material. If the particles are larger, they inevitably will contain some gangue. Accordingly, if the size of the fractured particles of feed material is reduced, more particles should be substantially free of gangue and will fall onto the pan. More feed material will therefore be extracted as gold and less will recirculate through the apparatus.

Increasing the speed of rotation of the chains will result in a finer product. A corresponding increase in the speed of the trommel will also have to be made to ensure that smaller particles containing some gold but also some gangue are caught in the trommel and recirculated. Such particles will be carried upward in the stream of air and will be expelled from the trommel unless the size of openings of the trommel are reduced.

(b) The fractured particles of feed material following impact with the side wall of the apparatus are too small. Three adjustments can be made at this point to correct the problem: first the speed of the trommel can be reduced to expel larger particles. The expelled particles must be examined to ensure that they do not contain a significant amount of gold. If they do not, then this adjustment will help to reduce the amount of material circulating in the apparatus with resulting increase in the throughput of material in the apparatus. If however this adjustment results in particles containing a significant amount of gold being expelled, then the trommel must be speeded up again.

A second adjustment is to reduce the rate of rotation of the chains so that the feed material will be broken into larger particles. At the same time, the speed of air flowing upward adjacent to the wall of the apparatus must be increased to lift larger particles which contain a significant amount of gangue. Larger particles which consist chiefly of gold will fall onto the pan. If these steps do not result in a significant increase in the volume of particles which fall onto the pan, then this adjustment is not effective.

Assuming that the foregoing adjustments are not effective, the rate of rotation of the trommel and the chains can be left unchanged but the speed of air flowing upward can be increased. Such increase in speed will cause a larger volume of material to pass through the apparatus with resulting increase in throughput.

By adjustment of the rate rotation of the trommel, the rate of rotation of the chains and the speed of air flowing upward adjacent to the side wall of the apparatus, optimum conditions for comminution and concentration of the ore within the apparatus can be achieved. The optimum results are a product on the pan substantially free of gangue and a waste-product or tailings that is substantially all gangue.

The following examples illustrate the effectiveness of the process of the invention for separating gold from a rock containing such precious metal.

EXAMPLE 1

The starting material was a rock containing quartz and associated gold of 5 to 30 microns grain size. Two samples of the rock were crushed to 100% passing 1½" mesh opening and passed in batch mode through the apparatus described above. The fine, light tailings product collected from the cyclone discharge after output 9 had a particle size distribution of K80 (where K stands for the percentage of material passing through the openings of a given size in a screen) of 30 microns and a K50 of 12 microns. The heavy, coarse, gold rich concentrate products collected from the pan 130 had a particle size distribution of K80 of 400 microns, K50 of 150 microns and only 10% less than 10 microns.

The apparatus 7 was controlled by setting the frequency controllers at 61 Hz for both the 20 hp blower motor and the 10 hp classifier or separator motor. A 150 hp main drive motor was employed and 9 chains of 6 links each of ⅜" G70 load chain with 3 links of ⅝"boronite attached to the free (outside) end of each. The results of these two tests are summarized below:

| Result # 1 | Weight (grams) | Gold Assay (grams/metric ton) |
|---|---|---|
| Assay Head (Feed) | | |
| Calculated Head | 6569 | 1.70 |
| Concentrate | 355 | 25.58 |
| Tailings | 6214 | 0.38 |
| Weight Recovery = 5.4% | | |
| Gold Recovery = 82.0% | | |

| Result # 2 | Weight (grams) | Gold Assay (grams/metric ton) |
|---|---|---|
| Assay Head (Feed) | | |
| Calculated Head | 6271 | 6.35 |
| Concentrate | 539 | 67.07 |
| Tailings | 5732 | 0.67 |
| Weight Recovery = 8.6% | | |
| Gold Recovery = 90.5% | | |

EXAMPLE 2

The starting material was a schist with quartz associated arsenopyrite and pyrite. The size distribution of the raw material was 100% minus 1½ inch. Gold particles of 10 to 30 microns were attached to the sulfides. The material was fed to the apparatus illustrated in FIGS. 11–13 and both the blower and classifier (separator) were set at 70 Hz and operated continuously. The operating temperature was 130 degrees Fahrenheit. Only 4 chains of 8 links each of ⅝" boronite were employed. The results of this test are summarized below:

| Result # 1 | Weight (kg) | Gold Assay (grams/metric ton) |
|---|---|---|
| Assay Head (Feed) | 462 | 10.0–32.5 |
| Calculated Head | 426 | 9.0 |
| Concentrate | 20.4 | 107.8 |
| Tailings | 411.0 | 4.0 |
| Weight Recovery = 4.4% | | |
| Gold Recovery = 57.4% | | |

EXAMPLE 3

The starting material was a placer deposit made up of particles of sand and gravel less than ½ inch in size. Gold was free and associated with quartz, arsenopyrite and pyrite.

The apparatus used including the chain was the same as in Example 2 except that both the blower and classifier (separator) were set at 65 Hz and the operating temperature was 150 degrees Fahrenheit. The results of this test are summarized below:

| Result # 1 | | |
|---|---|---|
| | Weight (kg) | Gold Assay (grams/metric ton) |
| Assay Head (Feed) | 234 | 0.02–0.86 |
| Calculated Head | 200 | 3.97 |
| Concentrate | 2.27 | 236 |
| Tailings | 198 | 1.69 |
| Weight Recovery = 1.0% | | |
| Gold Recovery = 57.8% | | |

In all examples the tailings had been pulverized to 100% less than 30 microns with a K80 of about 13 microns. The concentrates were much coarser with a K80 of about 150 microns and some particles were as coarse as 400 microns.

It was obvious from the continuous testing of the hard quartz rock that larger motors of about 300 and 30 hp respectively on the main drive and the blower would be advantageous for higher throughputs and long continuous operation. These larger motors would also allow more and/or larger chains of even harder materials. In the examples blades 120 were made of AR QT 350 steel. The links of chain were made of hard materials and alloys that do not stretch.

The above examples have been presented for the purposes of illustrating aspects or embodiments of the invention. The invention is not limited in any way to these examples or restricted to the raw materials, manner in which the equipment was operated, any settings or parts described in these examples.

The actual dimensions of components, the number of blades, the number of links of chain, the number of chains the rotational speeds, the clearances of the chains within the chamber and the like of components of representative examples of the invention are given above. It will be appreciated that they are given merely for purposes of illustration and are not limiting in any way. The specific parameters may be varied as long as the principles are respected. For example, the desired speed of the forced air is a function of the specific gravity of raw material and the rotational speed of chains. For another example, depending on the raw material, the number of blades and chains may be adjusted to produce optimum results.

While the principles of the process of the invention have now been made clear in the illustrated embodiments, there will be immediately obvious to those skilled in the art, many modifications of structure, arrangements, proportions, the elements, materials and components used in the practice of the invention, and otherwise, which are particularly adapted for specific environments and operational requirements without departing from these principles. The claims are therefore intended to cover and embrace such modifications within the limits only of the true spirit and scope of the invention.

We claim:

1. A process for recovering precious metals and/or heavy minerals from raw materials comprising the steps of:
   (i) providing a comminuting chamber having an interior space defined, in part, by side and lower walls;
   (ii) introducing said raw material into said chamber and causing said raw material to fracture into a first fraction of particles which contain a substantial proportion of precious metals and/or heavy minerals and which are of a size in the range at which any precious metals and/or heavy minerals therein are substantially liberated from the remainder of said raw material, a second fraction of particles which are of a size in the same range but which contain substantially less precious metals and/or heavy minerals and a third fraction of particles which are of a size larger than said range;
   (iii) causing air to flow upwardly in said chamber;
   (iv) adjusting the rate of upward flow of air of step (iii) in order to cause substantially all of the particles in the first fraction to fall onto said lower wall while particles in the second and third fractions are carried upward in the air flow; and
   (v) recovering particles which collect on said lower wall for separation of precious metals and/or heavy minerals therefrom.

2. A process for recovering precious metals and/or heavy minerals from raw materials comprising the steps of:
   (i) providing a comminuting chamber having an interior space defined, in part, by side and lower walls;
   (ii) causing said raw material to strike said side wall with sufficient velocity to cause said raw material to fracture into a first fraction of particles which contain a substantial proportion of precious metals and/or heavy minerals and which are of a size in the range at which any precious metals and/or heavy minerals therein are substantially liberated from the remainder of said raw material, a second fraction of particles which are of a size in the same range but which contain substantially less precious metals and/or heavy minerals and a third fraction of particles which are of a size larger than said range;
   (iii) causing air to flow into said chamber and along a path including: upwardly along the side wall;
   (iv) adjusting at least one of: (a) the rate of upward flow of air of step (iii); and (b) the velocity of the raw material of step (ii); in order to cause substantially all of the particles in the first fraction to fall onto said lower wall while particles in the second and third fractions are carried upward in the air flow; and
   (v) recovering particles which collect on said lower wall for separation of precious metals and/or heavy minerals therefrom.

3. A process for recovering precious metals and/or heavy minerals from raw materials comprising the steps of:
   (i) providing a comminuting chamber having an interior space defined, in part, by side and lower walls;
   (ii) directing raw material containing precious metals and/or heavy minerals downwardly onto impelling means located within said chamber such that said raw material collides with said impelling means and is driven thereby against said side wall with sufficient velocity to cause said raw material to fracture into a first fraction of particles which contain a substantial proportion of precious metals and/or heavy minerals and which are of a size in the range at which any precious metals and/or heavy minerals therein are substantially liberated from the remainder of said raw material, a second fraction of particles which are of a size in the same range but which contain substantially less precious metals and/or heavy minerals and a third fraction of particles which are of a size larger than said range;
   (iii) causing air to flow into said chamber and along a path including: upwardly along the side wall;
   (iv) adjusting at least one of: (a) the rate of upward flow of air of step (iii); and (b) the velocity of the raw material of step (ii); in order to cause substantially all of the particles in the first fraction to fall onto said lower wall while particles in the second and third fractions are carried upward in the air flow; and (v) recovering particles which collect on said lower wall for separation of precious metals and/or heavy minerals therefrom.

4. A process for recovering precious metals and/or heavy minerals from raw materials comprising the steps of:
(i) providing a comminuting chamber having an interior space defined, in part, by side and lower walls;
(ii) causing said raw material to strike said side wall with sufficient velocity to cause said raw material to fracture into a first fraction of particles which contain a substantial proportion of precious metals and/or heavy minerals and which are of a size in the range at which any precious metals and/or heavy minerals therein are substantially liberated from the remainder of said raw material, a second fraction of particles which are of a size in the same range but which contain substantially less precious metals and/or heavy minerals and a third fraction of particles which are of a size larger than said range;
(iii) causing air to flow into said chamber and along a path including: upwardly along the side wall; and to a separator
(iv) directing particles carried upward in the air flow into said separator for separating particles of a size within said range from particles of size larger than said range;
(v) recycling particles larger than said range from step (iv) to step (ii); and
(vi) adjusting at least one of: (a) the rate of upward flow of air of step (iii); (b) the velocity of the raw material of step (ii); and (c) the size of particles of step (iv) separated by said separator in order to cause substantially all of the particles in the first fraction to fall onto said lower wall while particles in the second and third fractions are carried upward in the air flow; and
(vii) recovering particles which collect on said lower wall for separation of precious metals and/or heavy minerals therefrom.

5. The process of claim 4 further including the step of: (viii) sealing said comminuting chamber from the atmosphere.

6. The process of claim 3 wherein said impelling means rotates about an axis and has a tip which is the furthermost point from said axis, said method including the step of: (vi) adjusting the speed of said tip to between about 440 and about 880 feet per second.

7. The process of claim 4 further including the step of: (viii) forming said side wall such that the area of said side wall against which said raw material is directed in step (ii) is smooth and free of cracks, edges or corners in which particles of raw material may collect.

8. The process of claim 4 further including the step of (viii) discharging the particles from step (vii) through an opening formed in said lower wall.

9. The process of claim 8 further including the step of: (ix) forming, an opening in said lower wall and providing an air-lock in communication with said opening; and (x) continuously discharging the particles from step (vii) through said opening and said air-lock.

10. The process of claim 3 further including the step of: (vi) providing chains as impelling means in step (ii).

11. The process of claim 10 further including the step of: (vii) providing impelling means consisting of a plurality of rigid elements interconnected by flexible elements in step (ii).

12. A process for recovering gold from raw materials comprising the steps of:
(i) providing a comminuting chamber having an interior space defined, in part, by side and lower walls;
(ii) introducing said raw material into said chamber and causing said raw material to fracture into a first fraction of particles which contain a substantial proportion of gold and which are of a size in the range at which any gold therein are substantially liberated from the remainder of said raw material, a second fraction of particles which are of a size in the same range but which contain substantially less gold and a third fraction of particles which are of a size larger than said range;
(iii) causing air to flow upwardly in said chamber;
(iv) adjusting the rate of upward flow of air of step (iii) in order to cause substantially all of the particles in the first fraction to fall onto said lower wall while particles in the second and third fractions are carried upward in the air flow; and
(v) recovering particles which collect on said lower wall for separation of gold therefrom.

13. A process for recovering gold from raw materials comprising the steps of:
(i) providing a comminuting chamber having an interior space defined, in part, by side and lower walls;
(ii) causing said raw material to strike said side wall with sufficient velocity to cause said raw material to fracture into a first fraction of particles which contain a substantial proportion of gold and which are of a size in the range at which any gold therein are substantially liberated from the remainder of said raw material, a second fraction of particles which are of a size in the same range but which contain substantially less gold and a third fraction of particles which are of a size larger than said range;
(iii) causing air to flow into said chamber and along a path including: upwardly along the side wall;
(iv) adjusting at least one of: (a) the rate of upward flow of air of step (iii); and (b) the velocity of the raw material of step (ii); in order to cause substantially all of the particles in the first fraction to fall onto said lower wall while particles in the second and third fractions are carried upward in the air flow; and
(v) recovering particles which collect on said lower wall for separation of gold therefrom.

14. A process for recovering gold from raw materials comprising the steps of:
(i) providing a comminuting chamber having an interior space defined, in part, by side and lower walls;
(ii) directing raw material containing gold downwardly onto impelling means located within said chamber such that said raw material collides with said impelling means and is driven thereby against said side wall with sufficient velocity to cause said raw material to fracture into a first fraction of particles which contain a substantial proportion of gold and which are of a size in the range at which any gold therein are substantially liberated from the remainder of said raw material, a second fraction of particles which are of a size in the same range but which contain substantially less gold and a third fraction of particles which are of a size larger than said range;
(iii) causing air to flow into said chamber and along a path including: upwardly along the side wall;
(iv) adjusting at least one of: (a) the rate of upward flow of air of step (iii); and (b) the velocity of the raw material of step (ii); in order to cause substantially all of the particles in the first fraction to fall onto said lower wall while particles in the second and third fractions are carried upward in the air flow; and (v) recovering particles which collect on said lower wall for separation of gold therefrom.

15. A process for recovering gold from raw materials comprising the steps of:

(i) providing a comminuting chamber having an interior space defined, in part, by side and lower walls;

(ii) causing said raw material to strike said side wall with sufficient velocity to cause said raw material to fracture into a first fraction of particles which contain a substantial proportion of gold and which are of a size in the range at which any gold therein are substantially liberated from the remainder of said raw material, a second fraction of particles which are of a size in the same range but which contain substantially less gold and a third fraction of particles which are of a size larger than said range;

(iii) causing air to flow into said chamber and along a path including: upwardly along the side wall; and to a separator (iv) directing particles carried upward in the air flow into said separator for separating particles of a size within said range from particles of size larger than said range;

(v) recycling particles larger than said range from step (iv) to step (ii); and (vi) adjusting at least one of: (a) the rate of upward flow of air of step (iii); (b) the velocity of the raw material of step (ii); and (c) the size of particles of step (iv) separated by said separator in order to cause substantially all of the particles in the first fraction to fall onto said lower wall while particles in the second and third fractions are carried upward in the air flow; and (vii) recovering particles which collect on said lower wall for separation of gold therefrom.

16. The process of claim 15 further including the step of: (viii) sealing said comminuting chamber from the atmosphere.

17. The process of claim 14 wherein said impelling means rotates about an axis and has a tip which is the furthermost point from said axis, said method including the step of: (vi) adjusting the speed of said tip to between about 440 and 880 feet per second.

18. The process of claim 15 further including the step of: (viii) forming said side wall such that the area of said side wall against which said raw material is directed in step (ii) is smooth and free of cracks, edges or corners in which particles of raw material may collect.

19. The process of claim 15 further including the step of (viii) discharging the particles from step (vii) through an opening formed in said lower wall.

20. The process of claim 19 further including the step of: (ix) forming an opening in said lower wall and providing an air-lock in communication with said opening; and (x) continuously discharging the particles from step (vii) through said opening and said air-lock.

21. The process of claim 14 further including the step of: (vi) providing chains as impelling means in step (ii).

22. The process of claim 14 further including the step of: (vii) providing impelling means consisting of a plurality of rigid elements interconnected by flexible elements in step (ii).

* * * * *